(12) United States Patent
Park

(10) Patent No.: US 12,555,458 B2
(45) Date of Patent: Feb. 17, 2026

(54) METHOD FOR INTELLIGENT ELECTRONIC MONITORING AND APPARATUS USING THE SAME

(71) Applicant: ELECTRONICS AND TELECOMMUNICATIONS RESEARCH INSTITUTE, Daejeon (KR)

(72) Inventor: Su-Wan Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 66 days.

(21) Appl. No.: 18/590,410

(22) Filed: Feb. 28, 2024

(65) Prior Publication Data

US 2025/0191456 A1 Jun. 12, 2025

(30) Foreign Application Priority Data

Dec. 12, 2023 (KR) .................. 10-2023-0179663

(51) Int. Cl.
G08B 21/02 (2006.01)
G08B 21/22 (2006.01)
H04W 4/029 (2018.01)

(52) U.S. Cl.
CPC ............ *G08B 21/22* (2013.01); *H04W 4/029* (2018.02)

(58) Field of Classification Search
CPC ...... A61M 2205/581; A61M 2205/332; A61M 2205/505; A61M 2205/583; A61M 2005/2073; A61M 5/2053; A61M 5/24; A61M 15/009; A61M 5/19; A61M 2205/50; A61M 2205/582; A61M 2205/8206; A61M 2005/206; A61M 2205/18; A61M 2205/587; A61M 5/3202; A61M 2005/208; A61M 2005/2086; A61M 2005/2481; A61M 2005/31588; A61M 2202/07;

(Continued)

(56) References Cited

U.S. PATENT DOCUMENTS

2003/0063004 A1* 4/2003 Anthony .......... G08B 13/19656
340/425.5
2008/0172700 A1* 7/2008 Jensen ................ H04L 41/0681
725/63

(Continued)

FOREIGN PATENT DOCUMENTS

KR 10-2022-0064131 A 5/2022
KR 10-2481788 B9 12/2022
KR 10-2023-0109408 A 7/2023

*Primary Examiner* — Daniel Previl
(74) *Attorney, Agent, or Firm* — Sughrue Mion, PLLC

(57) ABSTRACT

Disclosed herein are a method for intelligent electronic monitoring and an apparatus therefor. The method, performed by the apparatus, includes storing electronic positioning data, received from positioning terminals, for each monitoring subject; detecting an anomaly in at least one of the electronic positioning data for each monitoring subject, or the values of attributes constituting the electronic positioning data for each monitoring subject, or a combination thereof based on a pretrained anomaly detection model; extracting, when an anomaly is detected, the cause of the detected anomaly based on the electronic positioning data in which the anomaly is detected; and visually displaying the detected anomaly and the extracted cause based on a Graphical User Interface (GUI).

20 Claims, 12 Drawing Sheets

(58) Field of Classification Search
CPC ...... A61M 2205/14; A61M 2205/3306; A61M 2205/3313; A61M 2205/3592; A61M 2205/584; A61M 2205/6009; A61M 2209/086; A61M 5/2033; A61M 5/2448; A61M 5/2455; A61M 5/31568; A61M 5/46; A61M 15/0001; A61M 2005/3125; A61M 2205/6027; A61M 2205/6063; A61M 5/31; A61M 5/3287; A61M 5/5086; A61M 15/0021; A61M 15/0086; A61M 16/0003; A61M 16/0006; A61M 16/0051; A61M 16/024; A61M 2016/0027; A61M 2016/0039; A61M 2205/13; A61M 2205/3327; A61M 2205/3331; A61M 2205/3561; A61M 2205/3569; A61M 2205/43; A61M 2205/44; A61M 5/14244; A61M 5/14248; G09B 23/285; G09B 23/28; G06Q 10/00; A61N 1/0502; A61N 1/306; A61N 1/325; A61N 1/327; A61N 1/0412; A61N 1/0436; A61N 1/044; A61N 1/0448; A61K 31/711; A61K 2039/53; A61K 2039/54; A61K 39/292; A61K 31/445; A61K 47/32; A61K 9/0014; A61K 9/5026; A61B 17/205; A61B 2560/0462; A61B 2562/0247; A61B 5/0002; A61B 5/0876; A61B 5/091; A61B 5/097; A61B 5/14532; A61B 5/14546; A61B 5/15003; A61B 5/150229; A61B 5/150389; A61B 5/150503; A61B 5/150809; A61B 5/150816; A61B 5/150824; A61B 5/15087; A61B 5/153; A61B 5/155; A61B 5/157; A61B 5/412; A61B 5/4833; A61B 5/4839; A61B 5/682; A61B 5/7275; A61B 5/7282; A61B 5/742; A61P 31/20; C12N 15/8206; C12N 15/86; C12N 2730/10111; C12N 2730/10134; C12N 2730/10171; C12N 7/00; G16H 20/17; G16H 20/30; G08B 25/008; G08B 7/06
USPC ...... 340/573.1, 573.4, 573.3, 576, 582, 588, 340/680, 686.1, 691.6, 3.1, 825.19, 5.1, 340/5.28

See application file for complete search history.

(56) References Cited

U.S. PATENT DOCUMENTS

| | | | | |
|---|---|---|---|---|
| 2010/0295943 | A1* | 11/2010 | Cha | G01S 13/82 340/539.13 |
| 2014/0136609 | A1* | 5/2014 | Churchill | H04L 51/212 709/206 |
| 2021/0248703 | A1* | 8/2021 | Esplin | G06F 40/284 |
| 2021/0271957 | A1* | 9/2021 | Lee | G06N 20/00 |
| 2022/0116736 | A1* | 4/2022 | Williams | G16H 50/20 |
| 2022/0156513 | A1* | 5/2022 | Lee | G06V 10/26 |
| 2022/0195861 | A1* | 6/2022 | Patino Virano | G06Q 50/02 |

* cited by examiner

METHOD FOR INTELLIGENT ELECTRONIC MONITORING AND APPARATUS USING THE SAME

CROSS REFERENCE TO RELATED APPLICATION

This application claims the benefit of Korean Patent Application No. 10-2023-0179663, filed Dec. 12, 2023, which is hereby incorporated by reference in its entirety into this application.

BACKGROUND OF THE INVENTION

1. Technical Field

The present disclosure relates generally to intelligent electronic monitoring technology for learning patterns of electronic monitoring subjects and detecting abnormal situations using real-time location information, and more particularly to technology capable of providing a probation officer with causes of an abnormal situation (a location, a velocity, a direction, a day of the week, time, etc.) and a weight for each of the causes.

2. Description of the Related Art

An electronic monitoring system is a system that prevents recidivism by attaching an electronic device (electronic ankle bracelet) for tracking the locations of offenders with a high risk of recidivism and having them receive close guidance and supervision from a probation officer. Subjects of electronic monitoring are classified into subjects of one-to-one supervision, subjects of intensive supervision, and subjects of general supervision depending on their risk levels in which crime methods, criminal histories, living conditions, and the like are taken into account. Referring to data from the Ministry of Justice, the appropriate number of offenders to be managed by one probation officer is specified as one for subjects of one-to-one supervision, ten for subjects of intensive supervision, and forty for subjects of general supervision. However, because probation officers who manage the subjects of general supervision also supervise general criminals, most probation officers have to manage more than twice the appropriate number of people.

Further, as the legislation of the 'Act on the attachment of electronic devices, etc.', which manages people sentenced to imprisonment for stalking as subjects of electronic monitoring, has been recently preannounced, it is expected that the number of people to be managed by one probation officer will increase further.

The location-tracking-based electronic monitoring system is configured such that a control center and probation officers have to monitor whether each electronic monitoring subject complies with requirements, such as curfew for specified hours, prohibition of entry to specific places, prohibition of approaching victims, and the like, and this leads to a serious labor shortage. Furthermore, when an electronic monitoring subject visits a specific place to which entry is prohibited, such as a school zone, or goes out during curfew hours, an alarm is routinely triggered, but frequent alarms may increase the work fatigue of probation officers and reduce the efficiency of surveillance work.

Therefore, an Artificial-Intelligence-(AI-) based intelligent electronic monitoring system and service capable of maximizing the efficiency of electronic monitoring work, beyond the limitations of simple alarms, is urgently required.

The Ministry of Justice is seeking various AI-based electronic monitoring services, such as real-time risk analysis, automatic alarm classification, and evaluation of the risk of recidivism of sex offenders, through a project of intellectualizing the current electronic monitoring system. However, technology for detecting violation using only simple electronic positioning increases work fatigue due to the problems of frequent alarms and has limitations in accurate analysis of the cause of alarms.

DOCUMENTS OF RELATED ART (Patent Document 1) Korean Patent Application Publication No. 10-2023-0109408, published on Jul. 20, 2023 and titled "Device for detecting abnormal move of energy storage system using AI and multi-sensor".

SUMMARY OF THE INVENTION

An object of the present disclosure is to configure the daily life of an individual as an AI model by deeply analyzing past location information of an electronic monitoring subject from various angles and apply the same to real-time location information such that aberration is detected and that the causes and degree of the aberration are also provided in numerical values, thereby efficiently supporting the work of probation officers.

Another object of the present disclosure is to maximize efficiency of monitoring work beyond the limitation of merely processing alarms of an electronic monitoring system.

A further object of the present disclosure is to remedy problems with an electronic monitoring system, such as the shortage of dedicated personnel, limitations in merely processing alarms, the inefficient monitoring system, and the like, and to provide causes of an abnormal situation and figures for the causes such that a probation officer can easily understand the situation.

In order to accomplish the above objects, a method for intelligent electronic monitoring, performed by an apparatus for intelligent electronic monitoring, according to the present disclosure includes storing electronic positioning data, received from positioning terminals, for each monitoring subject; detecting an anomaly in at least one of the electronic positioning data for each monitoring subject, or the values of attributes constituting the electronic positioning data for each monitoring subject, or a combination thereof based on a pretrained anomaly detection model; extracting, when an anomaly is detected, a cause of the detected anomaly based on the electronic positioning data in which the anomaly is detected; and visually displaying the detected anomaly and the extracted cause based on a Graphical User Interface (GUI).

Here, detecting the anomaly may include identifying a risk group of a monitoring subject; when the monitoring subject corresponds to a low-risk group, determining that an anomaly is detected when an anomaly is detected in both a first detection result based on the electronic positioning data for each monitoring subject and a second detection result based on the values of the attributes; and when the monitoring subject corresponds to a high-risk group, determining that an anomaly is detected when an anomaly is detected in any one of the first detection result and the second detection result.

Here, detecting the anomaly may comprise, when there is a requirement of a user who observes the monitoring subject, determining that an anomaly is detected when an anomaly is detected in the second detection result depending on the requirement.

Here, extracting the cause may comprise extracting at least one attribute, the loss value of which is greater than a preset attribute threshold value, among attributes constituting the electronic positioning data in which the anomaly is detected, as the cause.

Here, the preset attribute threshold value may be set for each of the attributes in consideration of the characteristics of the attribute.

Here, the anomaly detection model may be managed by being separated based on the monitoring subject, the date and time, and a training period.

Here, detecting the anomaly may comprise selecting a single anomaly detection model in consideration of the monitoring subject matched with the received electronic positioning data, the date and time when the electronic positioning data is received, and the most recently trained model based on the time at which the electronic positioning data is received; and detecting the anomaly using the selected anomaly detection model.

Here, the electronic positioning data may include an electronic positioning value, a positioning method, and the time of positioning, and may be stored in a database by being mapped to an identifier assigned to each monitoring subject.

Here, the method may further include training the anomaly detection model with the electronic positioning data stored in the database, and the anomaly detection model may be trained so as to output whether a daily movement or a daily movement pattern is normal or abnormal when electronic positioning data is input.

Here, the anomaly detection model may be retrained based on the electronic positioning data periodically collected for a preset certain period.

Here, visually displaying the detected anomaly and the extracted cause may comprise providing a real-time anomaly detection result including an anomaly detection graph related to the anomaly and an abnormal-attribute detection graph related to the cause.

Also, an apparatus for intelligent electronic monitoring according to an embodiment of the present disclosure includes a processor for storing electronic positioning data, received from positioning terminals, for each monitoring subject, detecting an anomaly in at least one of the electronic positioning data for each monitoring subject, or the values of attributes constituting the electronic positioning data for each monitoring subject, or a combination thereof based on a pretrained anomaly detection model, extracting, when an anomaly is detected, a cause of the detected anomaly based on the electronic positioning data in which the anomaly is detected, and visually displaying the detected anomaly and the extracted cause based on a Graphical User Interface (GUI); and a database for storing the electronic positioning data.

Here, the processor may identify a risk group of a monitoring subject, determine that an anomaly is detected when an anomaly is detected in both a first detection result based on the electronic positioning data for each monitoring subject and a second detection result based on the values of the attributes if the monitoring subject corresponds to a low-risk group, and determine that an anomaly is detected when an anomaly is detected in any one of the first detection result and the second detection result if the monitoring subject corresponds to a high-risk group.

Here, when there is a requirement of a user who observes the monitoring subject, the processor may determine that an anomaly is detected when an anomaly is detected in the second detection result depending on the requirement.

Here, the processor may extract at least one attribute, the loss value of which is greater than a preset attribute threshold value, among attributes constituting the electronic positioning data in which the anomaly is detected, as the cause.

Here, the preset attribute threshold value may be set for each of the attributes in consideration of the characteristics of the attribute.

Here, the anomaly detection model may be managed by being separated based on the monitoring subject, the date and time, and a training period.

Here, the processor may select a single anomaly detection model in consideration of the monitoring subject matched with the received electronic positioning data, the date and time when the electronic positioning data is received, and the most recently trained model based on the time at which the electronic positioning data is received, and may detect the anomaly using the selected anomaly detection model.

Here, the electronic positioning data may include an electronic positioning value, a positioning method, and the time of positioning, and may be stored in the database by being mapped to an identifier assigned to each monitoring subject.

Here, the processor may train the anomaly detection model with the electronic positioning data stored in the database, and the anomaly detection model may be trained so as to output whether a daily movement or a daily movement pattern is normal or abnormal when electronic positioning data is input.

Here, the anomaly detection model may be retrained based on the electronic positioning data periodically collected for a preset certain period.

Here, the processor may provide a real-time anomaly detection result including an anomaly detection graph related to the anomaly and an abnormal-attribute detection graph related to the cause.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
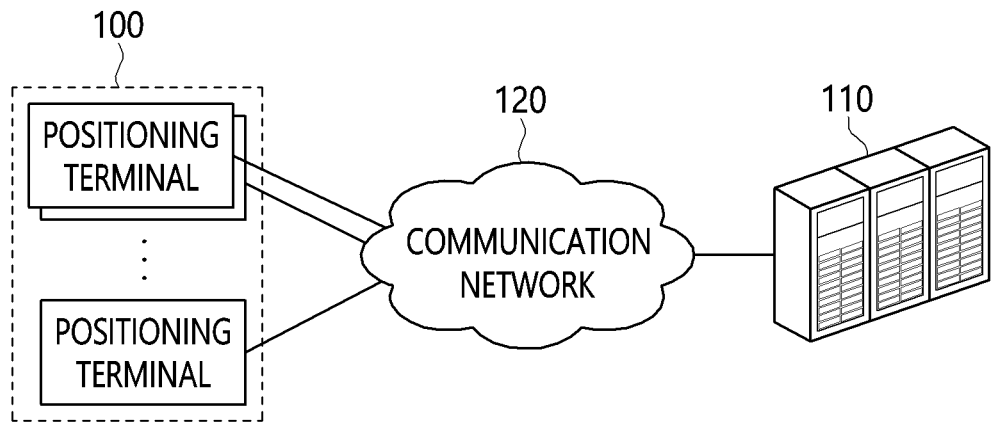
FIG. 1 is a view illustrating an intelligent electronic monitoring system according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

The present disclosure relates to technology that enables more effective and efficient electronic monitoring by providing causes of an abnormal situation and weights therefor, beyond the limitations of an existing electronic monitoring task, which only provides whether an anomaly is detected.

Hereinafter, a preferred embodiment of the present disclosure will be described in detail with reference to the accompanying drawings.

FIG. 1 is a view illustrating an intelligent electronic monitoring system according to an embodiment of the present disclosure.

Referring to FIG. 1, an intelligent electronic monitoring system according to an embodiment of the present disclosure includes a positioning terminal 100, an intelligent electronic monitoring apparatus 110, and a communication network 120.

The positioning terminal 100 may correspond to a terminal device, such as an electronic ankle bracelet worn by an electronic monitoring subject.

The intelligent electronic monitoring apparatus 110 stores electronic positioning data, which is received from the positioning terminal 100, for each monitoring subject.

Here, the electronic positioning data may include an electronic positioning value, a positioning method, and the time of positioning, and may be stored in a database by being mapped to an identifier assigned to each monitoring subject.

Also, the intelligent electronic monitoring apparatus 110 detects an anomaly in at least one of the electronic positioning data for each monitoring subject, or the values of attributes constituting the electronic positioning data, or a combination thereof based on a pretrained anomaly detection model.

Here, a risk group of the subject may be identified.

Here, when the monitoring subject corresponds to a low-risk group, it may be determined that an anomaly is detected when an anomaly is detected in both a first detection result based on the electronic positioning data for each monitoring subject and a second detection result based on the values of the attributes.

Here, when the monitoring subject corresponds to a high-risk group, it may be determined that an anomaly is detected when an anomaly is detected in any one of the first detection result and the second detection result.

Here, when there is a requirement of a user who observes the monitoring subject, it may be determined that an anomaly is detected when an anomaly is detected in the second detection result depending on the requirement.

Here, the anomaly detection model may be managed by being separated based on the monitoring subject, the date and time, and a training period.

Here, a single anomaly detection model may be selected in consideration of the monitoring subject matched with the received electronic positioning data, the date and time when the electronic positioning data is received, and the most recently trained model based on the time at which the electronic positioning data is received, and an anomaly may be detected using the selected anomaly detection model.

Also, the intelligent electronic monitoring apparatus 110 extracts the causes of the detected anomaly based on the electronic positioning data in which the anomaly is detected.

Here, among the attributes constituting the electronic positioning data in which the anomaly is detected, at least one attribute, the loss value of which is greater than a preset attribute threshold value, may be extracted as the cause.

Here, the preset attribute threshold value may be set for each of the attributes in consideration of the characteristics of the attribute.

Also, the intelligent electronic monitoring apparatus 110 visually displays the detected anomaly and the extracted cause based on a Graphical User Interface (GUI).

Here, a real-time anomaly detection result, including an anomaly detection graph related to the anomaly and an abnormal-attribute detection graph related to the cause, may be provided.

Also, the intelligent electronic monitoring apparatus 110 may train the anomaly detection model with electronic positioning data stored in the database.

Here, the anomaly detection model may be trained so as to output whether a daily movement or a daily movement pattern is normal or abnormal when electronic positioning data is input.

Here, the anomaly detection model may be retrained with electronic positioning data periodically collected during a preset certain period.

The communication network 120, that is, a network, may be conceptually understood to encompass networks that are currently being used and networks that have yet to be developed. For example, the network may be an IP network, which provides service for transmission and reception of a large amount of data and a seamless data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a 3.5G mobile communication network including a High-Speed Downlink Packet Access (HSDPA) network and an LTE network, a 4G mobile communication network including LTE advanced, a satellite communication network, and a Wi-Fi network.

Through the above-described intelligent electronic monitoring system, not only abnormal-situation detection for an individual electronic monitoring subject but also the causes of an abnormal situation and weights for the respective causes are provided, whereby a probation officer may easily and intuitively understand the detected abnormal situation.

Also, problems with an existing electronic monitoring system, such as the shortage of dedicated personnel, limitations in merely processing alarms, an inefficient monitoring system, and the like, may be remedied.

Figure 2:
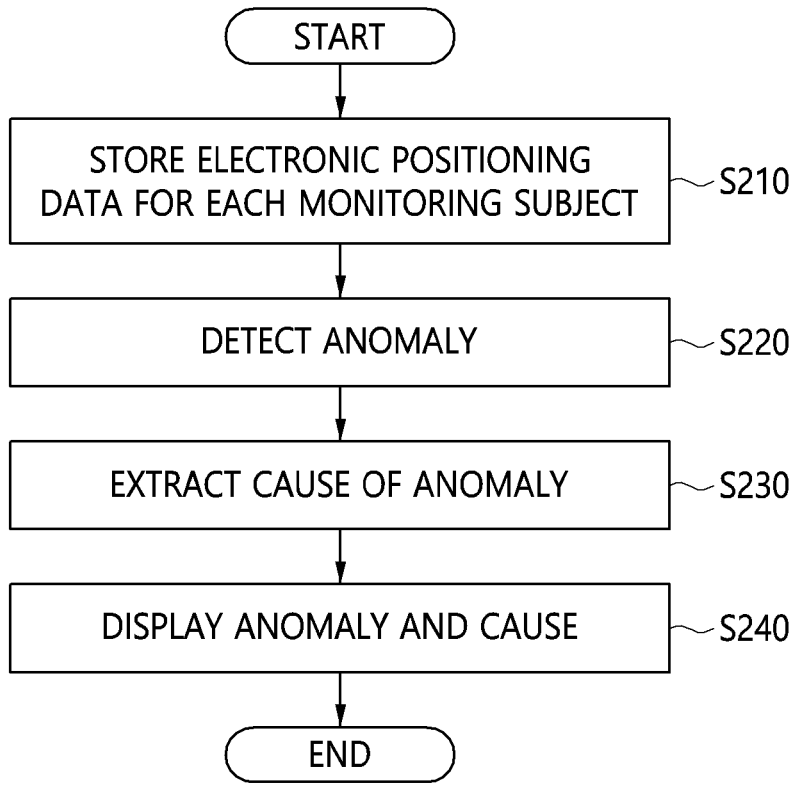
FIG. 2 is a flowchart illustrating a method for intelligent electronic monitoring according to an embodiment of the present disclosure.

FIG. 2 is a flowchart illustrating a method for intelligent electronic monitoring according to an embodiment of the present disclosure.

Referring to FIG. 2, in the method for intelligent electronic monitoring according to an embodiment of the present disclosure, an intelligent electronic monitoring apparatus stores electronic positioning data, which is received from positioning terminals, for each monitoring subject at step S210.

Here, the electronic positioning data may include an electronic positioning value, a positioning method, and the time of positioning, and may be stored in a database by being mapped to an identifier assigned to each monitoring subject.

Figure 3:
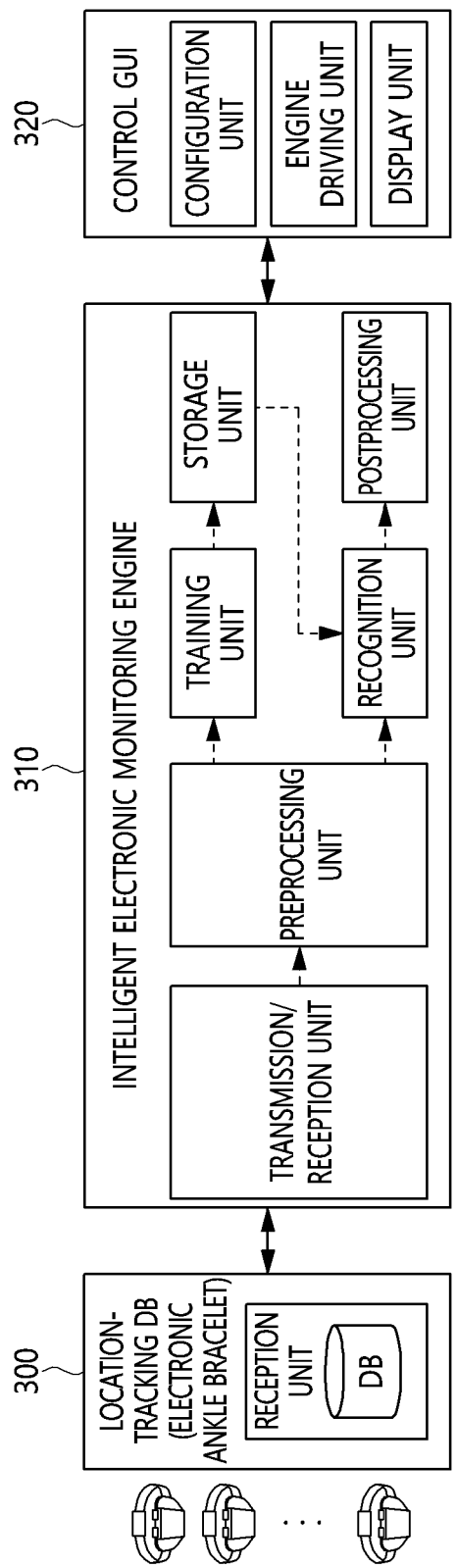
FIG. 3 is a view illustrating in more detail an intelligent electronic monitoring system according to the present disclosure.

For example, FIG. 3 is a view illustrating an intelligent electronic monitoring system according to the present disclosure in more detail, and the intelligent electronic monitoring system according to the present disclosure may be configured by being divided into three parts, which are a location-tracking database 300, an intelligent electronic monitoring engine 310, and a control GUI 320.

Electronic positioning data collected from positioning terminals (e.g., electronic ankle bracelets) worn by electronic monitoring subjects may be stored and managed in the location-tracking database 300.

The components of the intelligent electronic monitoring system illustrated in FIG. 3 may be integrated into a single server depending on the performance of the server, and some functions of the existing system may be integrated and operated for integration and interworking with the existing system.

Here, the intelligent electronic monitoring engine 310 may be operated by being scaled up and separated into multiple servers depending on the number of electronic monitoring subjects, and each engine may be configured with a transmission/reception unit, a preprocessing unit, a training unit, a storage unit, a recognition unit, and a postprocessing unit, as illustrated in FIG. 3.

The transmission/reception unit may serve to receive a request to drive an engine from the control GUI 320 and transfer the result thereof and serve to retrieve and fetch data required to drive the engine from the location-tracking database 300.

The preprocessing unit may serve to process electronic positioning data (location-tracking data) for each electronic monitoring subject such that the training unit or the recognition unit can use the electronic positioning data.

Here, the electronic positioning data that the preprocessing unit receives from the location-tracking database 300 may include latitude, longitude, a date, a time, and the like, and the method of processing the electronic positioning data for the use thereof in the training unit or recognition unit of the intelligent electronic monitoring engine 310 is as follows.

Referring to [Table 1], the latitude and the longitude may be expressed using five values by inferring location information converted into x, y, and z coordinates, a velocity, and direction information, the date may be expressed by encoding days of the week into seven values through one-hot encoding, and the time may be expressed as two values using sine and cosine functions capable of representing continuity of time. That is, features may be expressed as $X=(x, y, z, velocity, direction, weekday, sin\_hour, cos\_hour, \ldots )$.

Here, [Table 1] shows an embodiment, and features may be added using the given electronic positioning data. Also, various data-processing methods may be additionally used for performance improvement.

Also, the preprocessing unit may apply data scaling within the range of training data in order to adjust the range of the value of electronic positioning data, and in the present disclosure, MinMaxScaler or StandardScaler may be applied in order to display the loss value of each attribute based on an attribute threshold value.

Here, [Table 1] illustrates an example of data representations in which data scaling is applied to the feature values.

TABLE 1

| location-tracking DB | latitude, longitude | latitude, longitude | latitude, longitude | date | time |
|---|---|---|---|---|---|
| result from preprocessing unit (features) | x, y, z | velocity | direction | mon, tue, wed, thu, fri, sat, sun | sin_hour, cos_hour |
| data representation | (0.390973, 0.403577, 0.416630) | 0.456995 | 0.395349 | (1.0, 0.0, 0.0, 0.0, 0.0, 0.0, 0.0) | (0.511628, 0.511628) |
| attribute | location | velocity | direction | day of week | time |

Also, although not illustrated in FIG. 2, in the method for intelligent electronic monitoring according to an embodiment of the present disclosure, the intelligent electronic monitoring apparatus may train the anomaly detection model with electronic positioning data stored in the database.

Here, the anomaly detection model may be trained so as to output whether a daily movement or a daily movement pattern is normal or abnormal when electronic positioning data is input.

Here, the anomaly detection model may be retrained based on electronic positioning data periodically collected during a preset certain period.

Here, the anomaly detection model may be managed by being separated based on the monitoring subject, the date and time, and a training period.

For example, referring to the intelligent electronic monitoring engine 310 illustrated in FIG. 3, the training unit may serve to learn the daily movement or daily movement pattern of an electronic monitoring subject in each period set by the configuration unit of the control GUI 320 and to generate a neural network model (anomaly detection model).

Here, the daily movement or the daily movement pattern may be generated based on data for a certain period, such as a month or a week, which is set for each electronic monitoring subject, and the neural network model (anomaly detection model) may be generated and used for each electronic monitoring subject or according to the date or the training period in consideration of the characteristics of the electronic monitoring subject.

For example, this may be applied for an electronic monitoring subject having a specific movement pattern every weekend or every week or for a high-risk electronic monitoring subject who should be closely monitored.

The storage unit may manage the neural network model (anomaly detection model) generated by the training unit by separating the same based on the electronic monitoring subject, the date and time, and a training period.

Also, in the method for intelligent electronic monitoring according to an embodiment of the present disclosure, the intelligent electronic monitoring apparatus detects an anomaly in at least one of the electronic positioning data for each monitoring subject, or the values of the attributes constituting the electronic positioning data for each monitoring subject, or a combination thereof based on the pre-trained anomaly detection model at step S220.

Here, a single anomaly detection model may be selected in consideration of the monitoring subject matched with the received electronic positioning data, the date and time when the electronic positioning data is received, and the most recently trained model based on the time at which the electronic positioning data is received, and an anomaly may be detected using the selected anomaly detection model.

For example, referring to FIG. 3, the intelligent electronic monitoring engine 310 may acquire electronic positioning data from the location-tracking database 300 in real time and perform a function to detect an abnormal situation for each electronic monitoring subject.

The recognition unit may be operated in the background so as to detect an abnormal situation pertaining to electronic monitoring subjects using the latest neural network model (anomaly detection model) managed by the storage unit.

Here, the networks of the training unit and recognition unit may apply unsupervised learning (e.g., Autoencoder (AE), Long Short-Term Memory (LSTM) Autoencoder (LSTMAE)).

Figure 4:
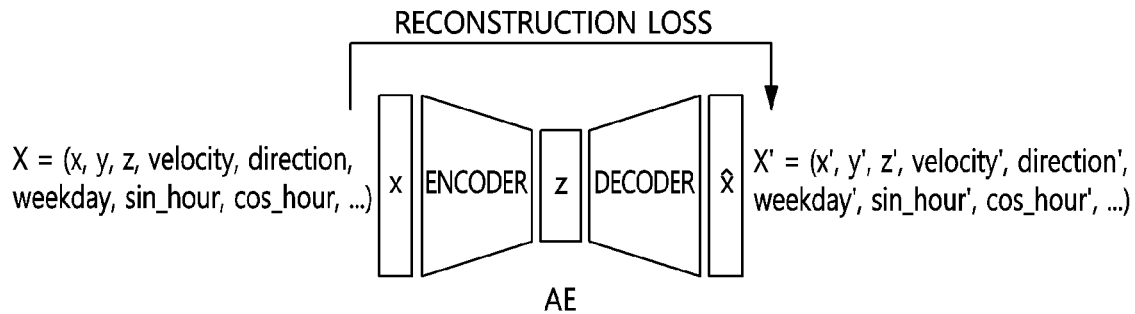
FIG. 4 and FIG. 5 are views illustrating an example of a neural network and input data for training or recognition according to the present disclosure.
Figure 5:
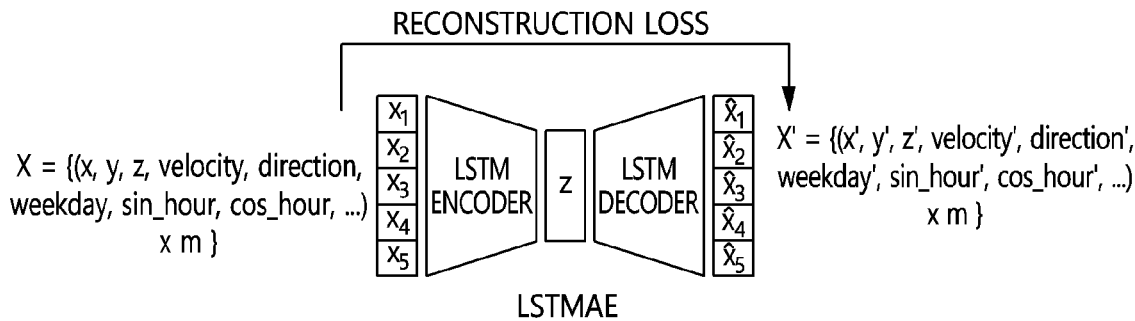

For example, an embodiment for a neural network and input data for training or recognition based on AE or LSTMAE according to the present disclosure may be represented as shown in FIGS. 4 to 5.

First, referring to FIG. 4, the AE may receive a single piece of data X configured with the preprocessed attribute values and calculate a reconstruction loss value using the output X'.

Referring to FIG. 5, the LSTMAE may receive m sequential pieces of data, each including the preprocessed attribute values, as X and calculate a reconstruction loss value using the m pieces of X' output therefrom.

Here, when multiple pieces of input data are used as in the LSTMAE, an attribute such as a direction needs to be used after being corrected using the actual moving direction values of N pieces of data due to characteristics including unstable location values of the electronic positioning data collected by positioning terminals.

Here, a risk group of the monitoring subject may be identified.

When the monitoring subject corresponds to a low-risk group, it may be determined that an anomaly is detected when an anomaly is detected in both a first detection result based on the electronic positioning data for each monitoring subject and a second detection result based on the attribute values.

Conversely, when the monitoring subject corresponds to a high-risk group, it may be determined that an anomaly is detected when an anomaly is detected in any one of the first detection result and the second detection result.

Figure 15:
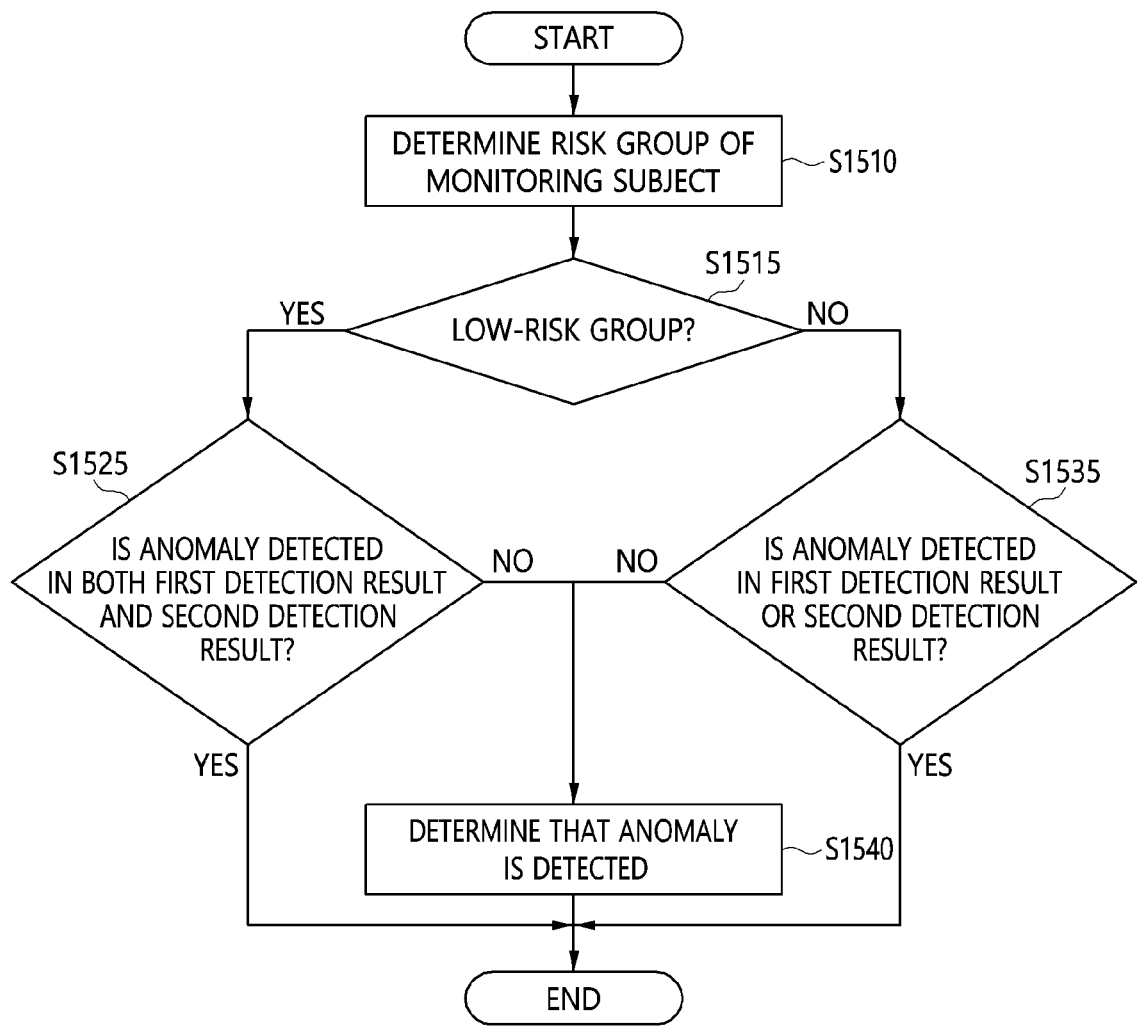
FIG. 15 is a flowchart illustrating an anomaly detection process according to an embodiment of the present disclosure in detail.

For example, referring to FIG. 15, the intelligent electronic monitoring apparatus according to an embodiment of the present disclosure may determine the risk group of a specific monitoring subject based on electronic positioning data for each monitoring subject at step S1510.

Here, the risk group may include a low-risk group and a high-risk group.

Subsequently, whether the specific monitoring subject corresponds to the low-risk group is determined at step S1515, and when the specific monitoring subject corresponds to the low-risk group, whether an anomaly is detected in both the first detection result and the second detection result may be determined at step S1525.

Subsequently, when it is determined at step S1525 that an anomaly is detected in both the first detection result and the second detection result, it may be determined that an anomaly happens to the specific monitoring subject at step S1540.

That is, when the specific monitoring subject corresponds to the low-risk group, the detection condition is eased, whereby an alarm may be adjusted not to be frequently triggered by anomalies.

Also, when it is determined at step S1515 that the specific monitoring subject corresponds to the high-risk group, whether an anomaly is detected in the first detection result or the second detection result may be determined at step S1535.

Subsequently, when it is determined at step S1535 that an anomaly is detected in the first detection result or the second detection result, it may be determined that an anomaly happens to the specific monitoring subject at step S1540.

That is, when the specific monitoring subject corresponds to the high-risk group, the detection condition is strengthened, whereby an alarm may be adjusted to be triggered even when a slight anomaly is detected.

Also, when it is determined at step S1525 that an anomaly is not detected in the first detection result or the second detection result, it may be determined that no anomaly is detected in the specific monitoring subject.

Also, when it is determined at step S1535 that no anomaly is detected in any of the first detection result and the second detection, it may be determined that no anomaly is detected in the specific monitoring subject.

Here, when there is a requirement of a user who observes the monitoring subject, it may be determined that an anomaly is detected when an anomaly is detected in the second detection result depending on the requirement.

For example, if the requirement of the user is related to attribute A, when the loss value of attribute A, among the attributes constituting electronic positioning data for each monitoring subject, is greater than a preset attribute threshold value, it may be determined that an anomaly occurs.

Also, in the method for intelligent electronic monitoring according to an embodiment of the present disclosure, the intelligent electronic monitoring apparatus extracts the causes of the detected anomaly based on the electronic positioning data in which the anomaly is detected at step S230.

Here, among the attributes constituting the electronic positioning data in which the anomaly is detected, at least one attribute, the loss value of which is greater than a preset attribute threshold value, may be extracted as the cause.

Here, the preset attribute threshold value may be set for each of the attributes in consideration of the characteristics of the attribute.

Here, in the present disclosure, various loss functions (e.g., Mean Squared Error (MSE), Binary Cross Entropy (BCE), Cross Entropy Error (CEE), and the like) may be selectively used, and an embodiment of the present disclosure will be described based on MSE.

For example, referring to FIG. 3, the postprocessing unit of the intelligent electronic monitoring engine 310 may serve to receive a result value determined to be an anomaly from the recognition unit, analyze the same for each attribute, and process the attributes, based on which the anomaly is detected, so as to be displayed as numerical values.

Here, the postprocessing unit corresponds to a step subsequent to the recognition unit for detecting an abnormal situation by receiving real-time location information, and is the part including the distinctive characteristic of the present disclosure.

Anomaly detection in the existing technology is a matter of classifying a daily movement or a daily movement pattern as a normal or abnormal one, but the present disclosure may provide not only information about whether an anomaly is detected but also information about attributes (a location, a velocity, a direction, a day of the week, and a time), based on which the anomaly is detected, in numerical values. Therefore, the present disclosure presents an anomaly detection method including two phases in order to provide the cause of an anomaly as well as anomaly detection.

For example, in the first phase, whether an abnormal situation pertaining to an electronic monitoring subject occurs may be determined using the loss function that is the same as that of the training unit illustrated in FIG. 3. The abnormal situation may be determined in such a way that, when the Mean Squared Error (MSE) of (X, X') is less than a preset threshold value, it is normal, but when the MSE is greater than the threshold value, it is abnormal, as shown in Equation (1). Here, the threshold value may be set tightly such that it can be applied in common to all electronic monitoring subjects, or may be set individually depending on the risk level of each electronic monitoring subject.

$$\text{Loss} = \frac{1}{nm} \sum_{i=1,j=1}^{n,m} (x_{ij} - x'_{ij})^2 \qquad (1)$$

$n$ = Number of features $m$ = number of features

Subsequently, in the second phase, the cause of the anomaly detected in the first phase may be detected.

Figure 6:
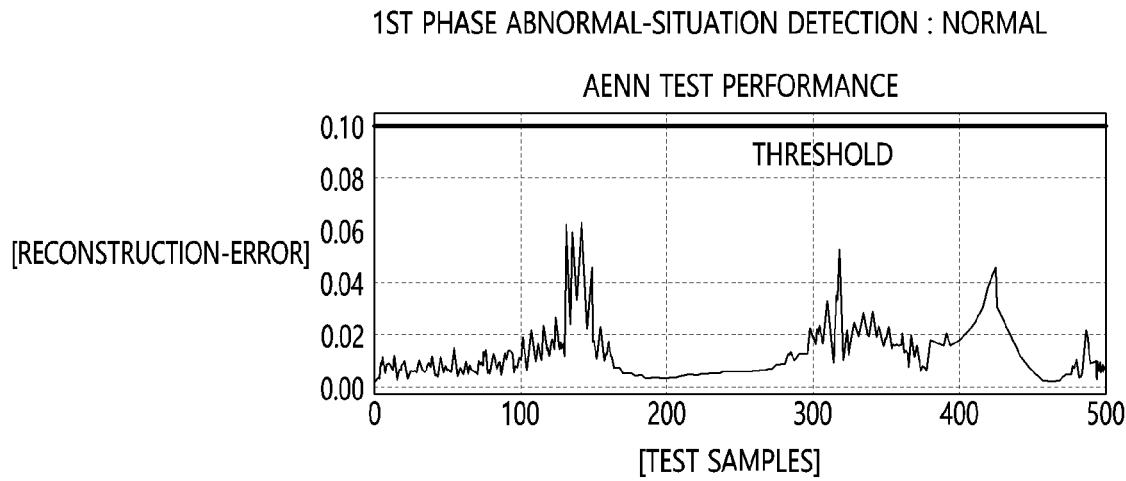
FIGS. 6 to 9 are views illustrating an example of detection of an abnormal situation and detection of abnormal attributes according to the present disclosure.
Figure 7:
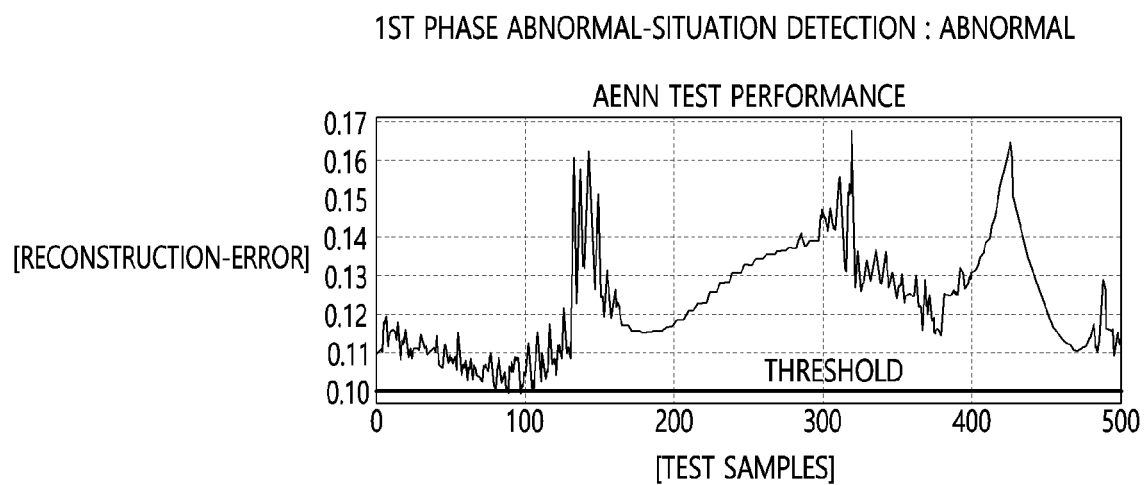
Figure 8:
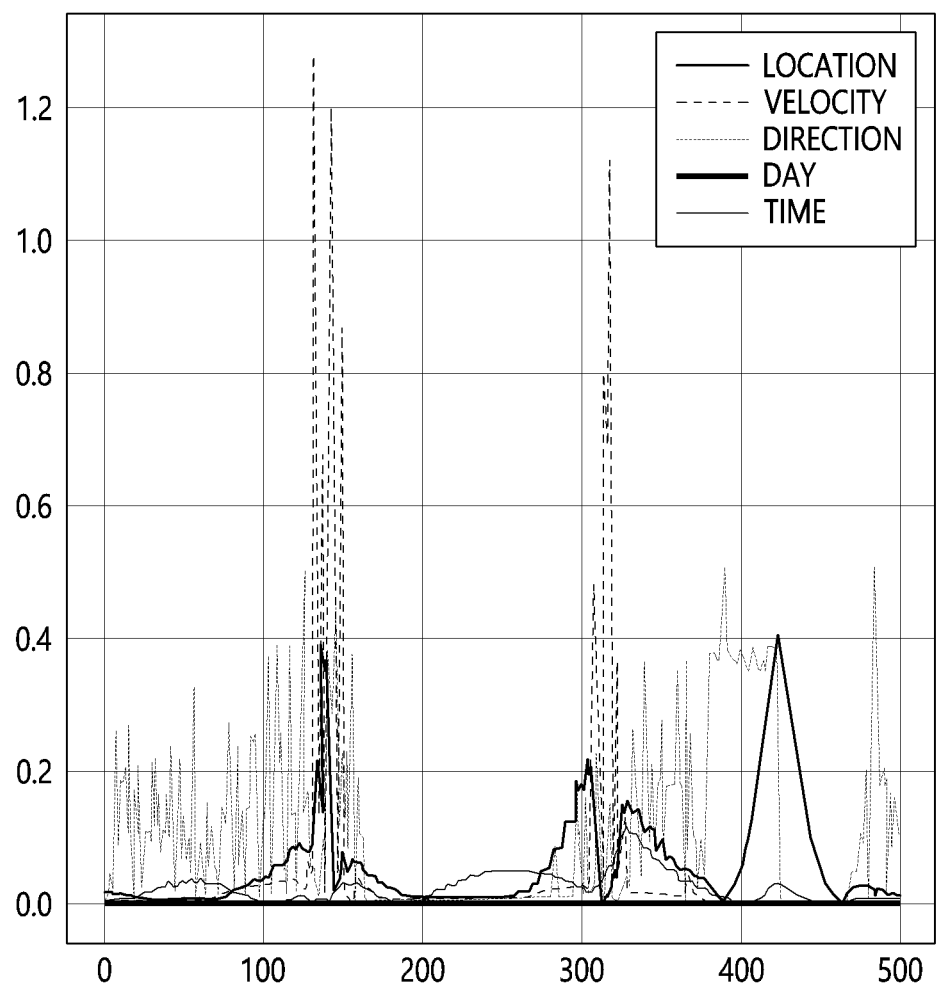

For example, because the existing technology provides only a single loss value based on which an anomaly is detected, as shown in FIGS. 6 to 7, it is difficult to recognize why an abnormal situation occurs. However, the present disclosure may provide the causes of an abnormal situation and the degree thereof through the loss values of the respective attributes, as shown in FIGS. 8 to 9.

Figure 9:
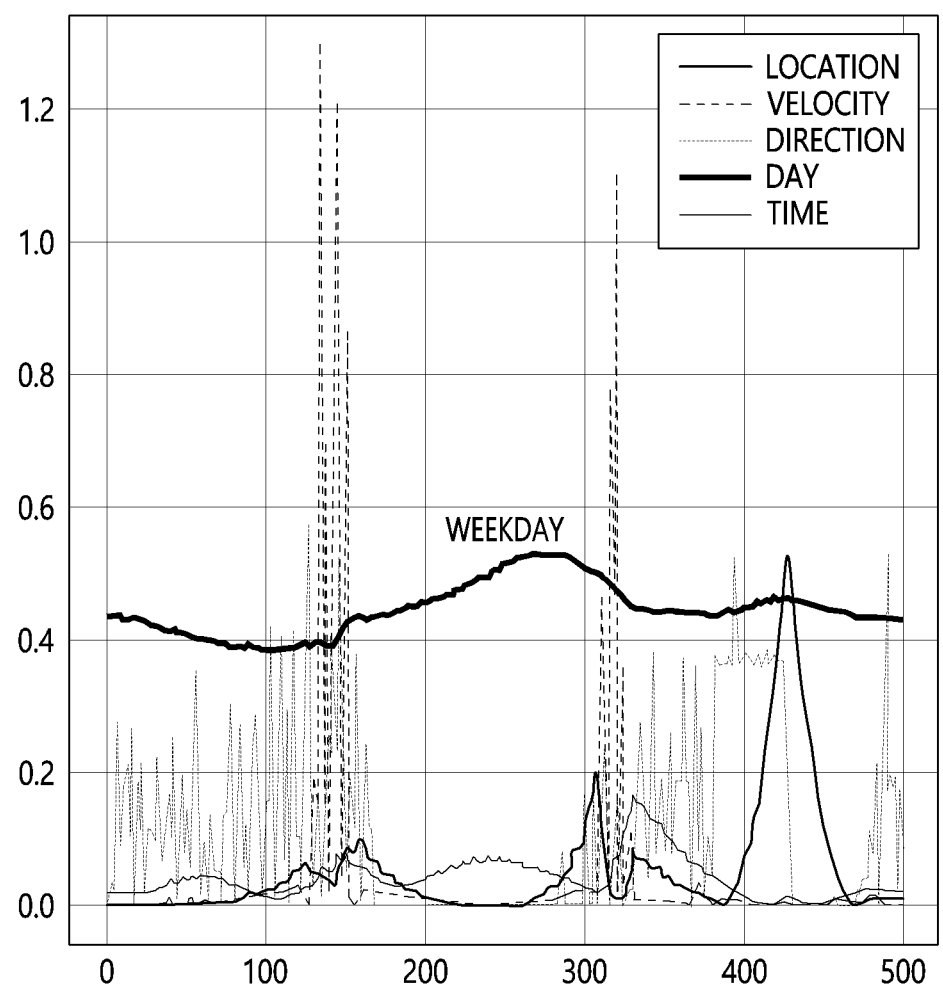

That is, in the abnormal situation in which the loss value is greater than a preset threshold value (=0.1), as shown in FIG. 7, it can be seen that a day of the week, the loss value of which is large, is the cause of the anomaly through the attribute graph illustrated in FIG. 9.

Here, the attributes analyzed in the second phase may be classified based on the values provided by the preprocessing unit, as shown in Equation (2), and because various types of information can be additionally used, the types of attributes are not limited.

$$\text{Location} = \frac{1}{3}\{(x-x')^2 + (y-y')^2 + (z-z')^2\} \qquad (2)$$

$$\text{Velocity} = (vel - vel')^2$$

$$\text{Direction} = (dir - dir')^2$$

$$\text{Day} = \frac{1}{7}\sum_{i=1}^{n}(\text{day}_i - \text{day}'_i)^2, n = \{mon, tue, \ldots, sun\}$$

$$\text{Time} = \frac{1}{2}\{(\text{sinhour} - \text{sinhour}')^2 + (\text{coshour} - \text{coshour}')^2\}$$

Here, the loss values of the respective attributes (e.g., the location, the velocity, the direction, the day of the week, the time, . . . ) may have a range set by a minimum value and a maximum value, and more precise anomaly detection may be performed using the threshold values for the attributes. The threshold values for the respective attributes may be set in consideration of the characteristics of the attributes.

For example, because the range of the loss values of the location and velocity may increase and fall out of the range of training, they may be set to [0, ∞]. Also, when the direction, the day of the week, and the time have the same range as training data, the range of the loss values thereof is set to [0, 1.0] such that a numerical value for an abnormal situation is provided, but when they have a range different from the range of the training data, it is necessary to set the range of the maximum value of an error value to [0, n] in consideration of the possibility that the error value can further increase.

Hereinafter, the characteristics of the present disclosure will be described in detail taking an example of FIGS. 10 to 11.

Figure 10:
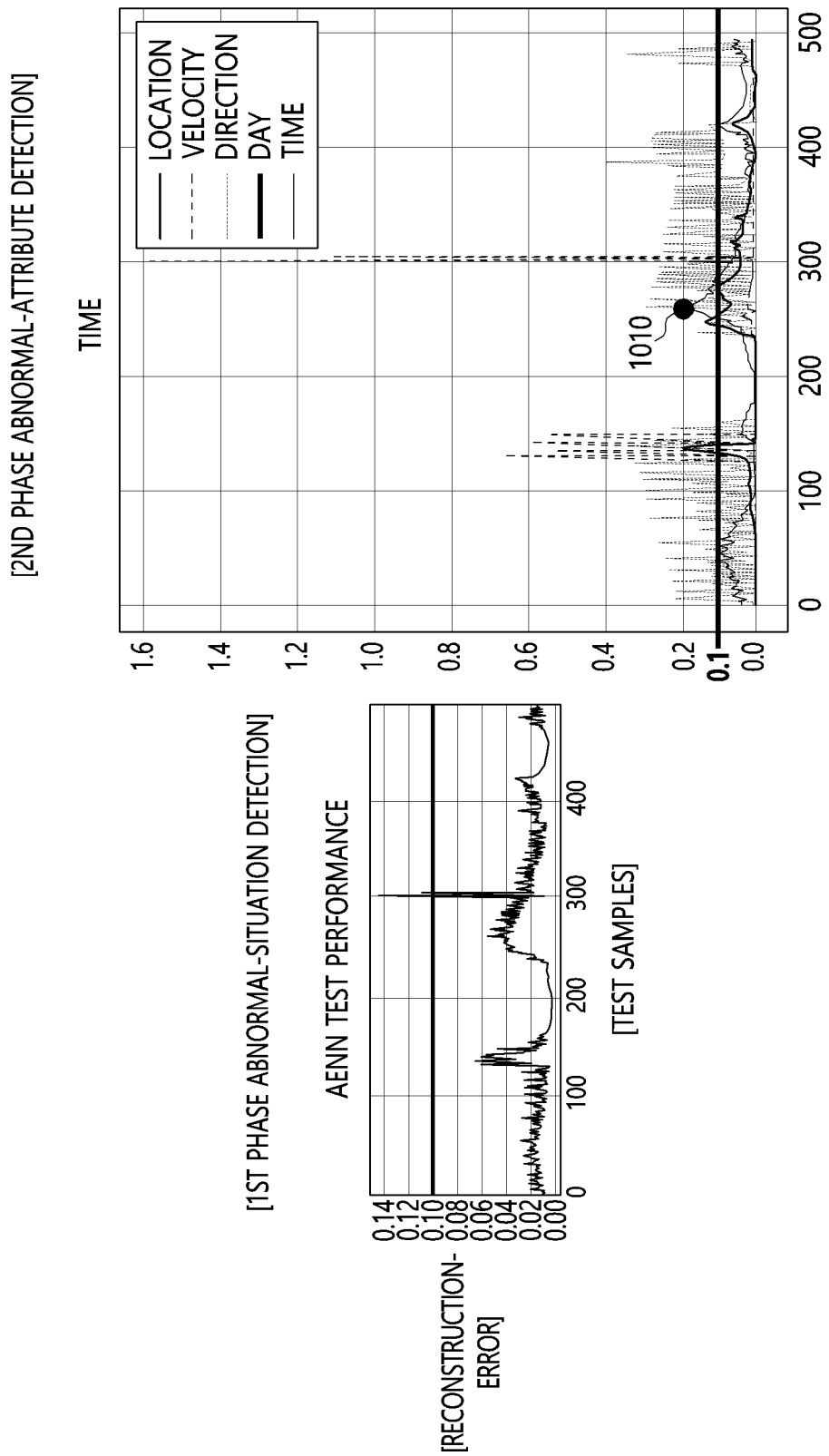
FIG. 10 and FIG. 11 are views illustrating an example of setting a threshold value for each attribute according to the present disclosure.

First, FIG. 10 corresponds to an example of detecting an abnormal situation in the first phase by setting a threshold value to 0.1. However, when the actual training data includes all of a range of 360 degrees for a direction, a range of Monday to Sunday for a day of the week, and a range of 24 hours for time, the occurrence of an abnormal situation by the time attribute, which is missed in the first phase, is recognized in the second phase for detecting abnormal attributes, because the time attribute is above the attribute threshold value as at the point 1010.

Figure 11:
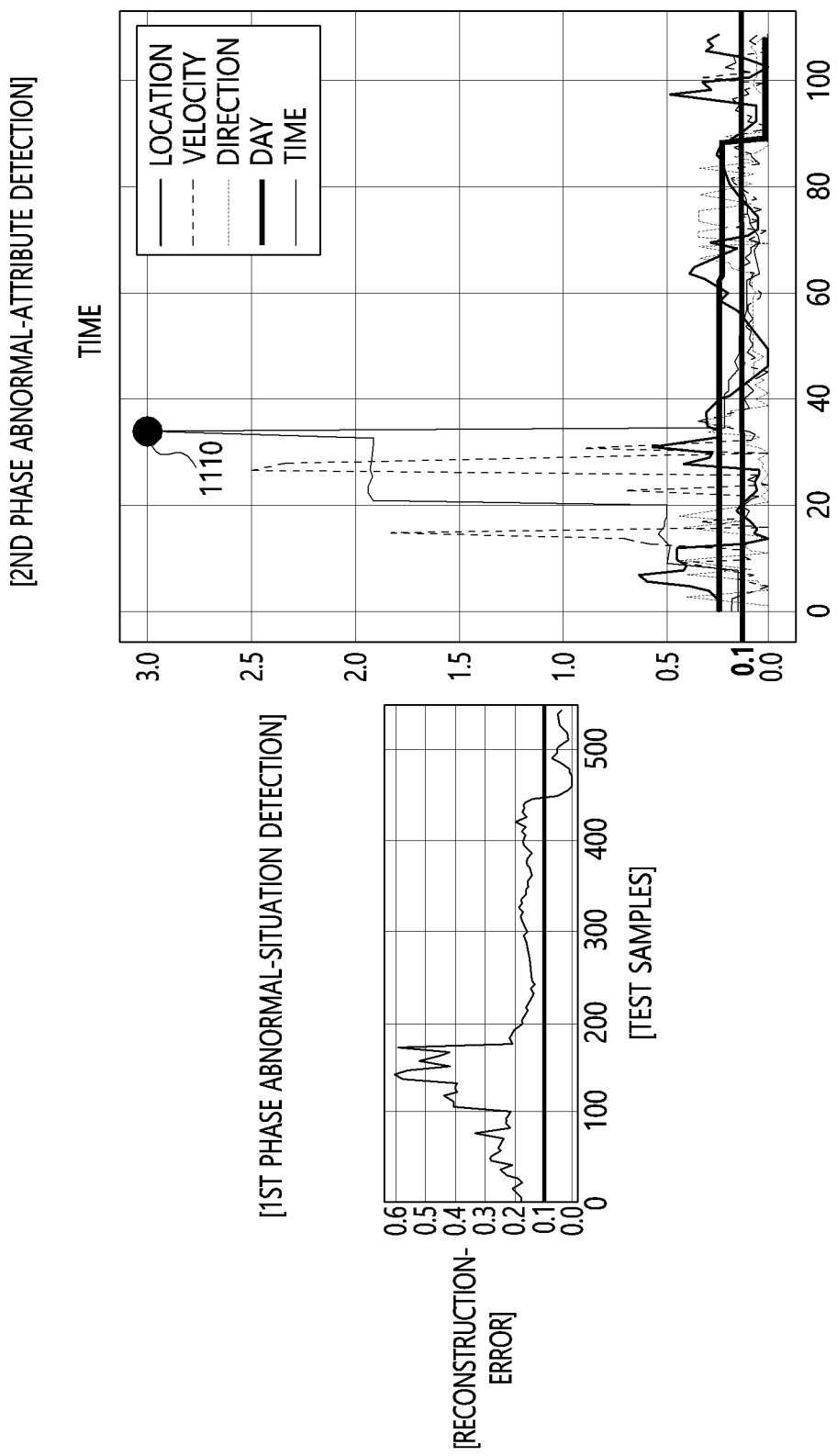

Also, FIG. 11 shows that the abnormal attribute value in the second phase may be used based on the result of detecting an abnormal situation in the first phase. Here, when the training data includes a part of the time value, the time error value of test data falling out of the training data range may further increase.

Also, in the method for intelligent electronic monitoring according to an embodiment of the present disclosure, the intelligent electronic monitoring apparatus visually displays the detected anomaly and the extracted cause based on a Graphical User Interface (GUI) at step S240.

Here, a real-time anomaly detection result, including an anomaly detection graph related to the anomaly and an abnormal-attribute detection graph related to the cause, may be provided.

That is, the present disclosure may present a more effective and understandable anomaly detection result by detecting an abnormal situation in the first phase and precisely setting a threshold value for abnormal-attribute detection in the second phase. Such a result is expressed in the form of a graph for each attribute and a representation of a threshold value through the control GUI 320 illustrated in FIG. 3, thereby being used to improve the understanding of a probation officer.

Here, the control GUI 320 may provide an interface for settings for driving the intelligent electronic monitoring engine 310 and an interface for requesting driving of the intelligent electronic monitoring engine 310, and may serve to display whether an anomaly is detected in each electronic monitoring subject, the causes of the anomaly, and weights for the causes, which are results in response to the request, to the probation officer.

Also, the control GUI 320 may include user interface functions required for operating the intelligent electronic monitoring engine 310, and may be configured with a configuration unit, an engine driving unit, and a display unit.

The configuration unit of the control GUI 320 may serve to set threshold values required for operating the intelligent electronic monitoring engine 310. For example, the functions of the configuration unit may include setting threshold values for anomaly detection, which are applied to each electronic monitoring subject or applied in common to electronic monitoring subjects, setting threshold values for respective attributes, setting a training data period, managing a neural network for each electronic monitoring subject, and the like.

The engine driving unit of the control GUI 320 may serve to request training and recognition from the intelligent electronic monitoring engine 310 through RESTful APIs.

The display unit of the control GUI 320 may serve to receive a result of real-time abnormal-situation detection for each electronic monitoring subject, which is performed by the recognition unit running in the background of the intelligent electronic monitoring engine 310, through the postprocessing unit and to visually display the result.

Here, the display unit displays whether an anomaly is detected and the causes (attributes) of the anomaly in numerical values in the existing electronic monitoring GUI system, which shows the movement path of each electronic monitoring subject, thereby serving to reduce and efficiently support the work of a probation officer in response to frequent false-positive alarms.

Through the above-described method for intelligent electronic monitoring, active anomaly detection is performed by an AI-based electronic monitoring system, whereby the work burden of personnel dedicated to managing electronic monitoring subjects may be reduced.

Also, exhausting work for processing frequent alarms of the existing electronic monitoring system may be prevented, and an advanced intelligent electronic monitoring service that provides both whether an abnormal situation occurs and the causes of the abnormal situation may be provided.

Also, a scalable function for analyzing causes of an abnormal situation may be provided using various types of attribute information, and a phased and intensive abnormal-situation detection function may be provided using weights and threshold values for respective attributes related to an abnormal situation.

Also, customized management and supervision may be performed for each electronic monitoring subject in consideration of the attributes and characteristics of the electronic monitoring subject.

Figure 12:
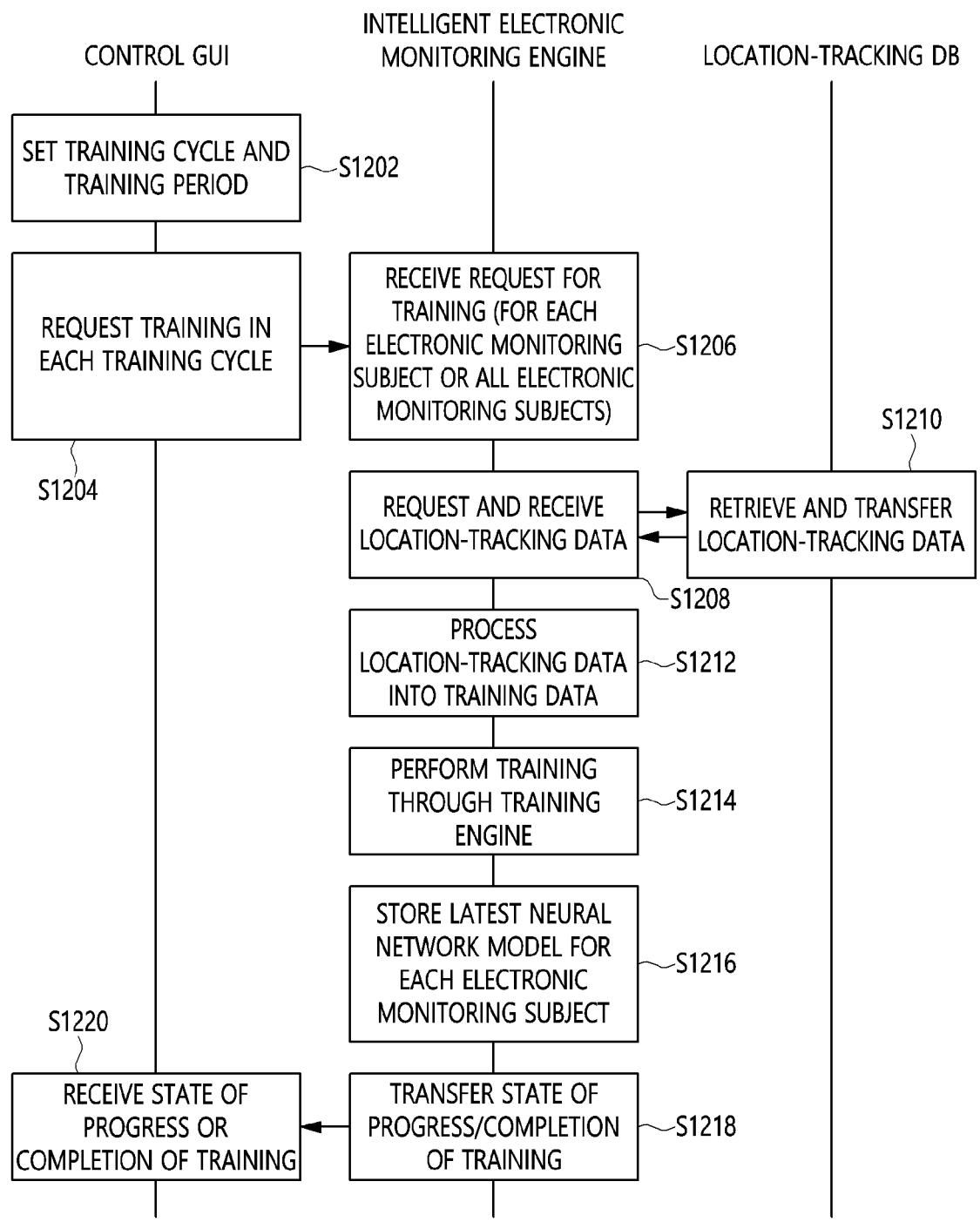
FIG. 12 is a flowchart illustrating in detail a process of training a neural network for detecting an abnormal situation according to an embodiment of the present disclosure.

FIG. 12 is a flowchart illustrating in detail a process of training a neural network for detecting an abnormal situation according to an embodiment of the present disclosure.

Referring to FIG. 12, in the process of training a neural network for detecting an abnormal situation according to an embodiment of the present disclosure, first, a training cycle, a training period, and the like may be set through the configuration unit of the control GUI at step S1202.

Subsequently, when a request for periodic training is automatically or manually made to the intelligent electronic monitoring engine through the engine driving unit of the control GUI at step S1204, the transmission/reception unit of the intelligent electronic monitoring engine may receive the request for training at step S1206 and fetch the required location-tracking data (electronic positioning data) of an electronic monitoring subject from the location-tracking database at steps S1208 and S1210.

Subsequently, the raw location-tracking data collected from electronic ankle bracelets may be processed into training data through the preprocessing unit of the intelligent electronic monitoring engine at step S1212 and transferred as the input to the training engine of the training unit.

Subsequently, when training using the data on the electronic monitoring subject for a certain period is completed at step S1214, the generated neural network model may be managed through the storage unit at step S1216 along with data such as the ID of the electronic monitoring subject, the generation date, the training period, and the like.

Subsequently, the transmission/reception unit of the intelligent electronic monitoring engine may transfer information about the state of progress of training and completion to the engine driving unit of the control GUI at step S1218 as the response to the request for training, whereby the training process may be terminated at step S1220.

Here, the process illustrated in FIG. 12 may be repeatedly performed as many times as the number of electronic monitoring subjects, and the training cycle and the type of the engine may be variously set and used depending on the risk level of the electronic monitoring subject.

Figure 13:
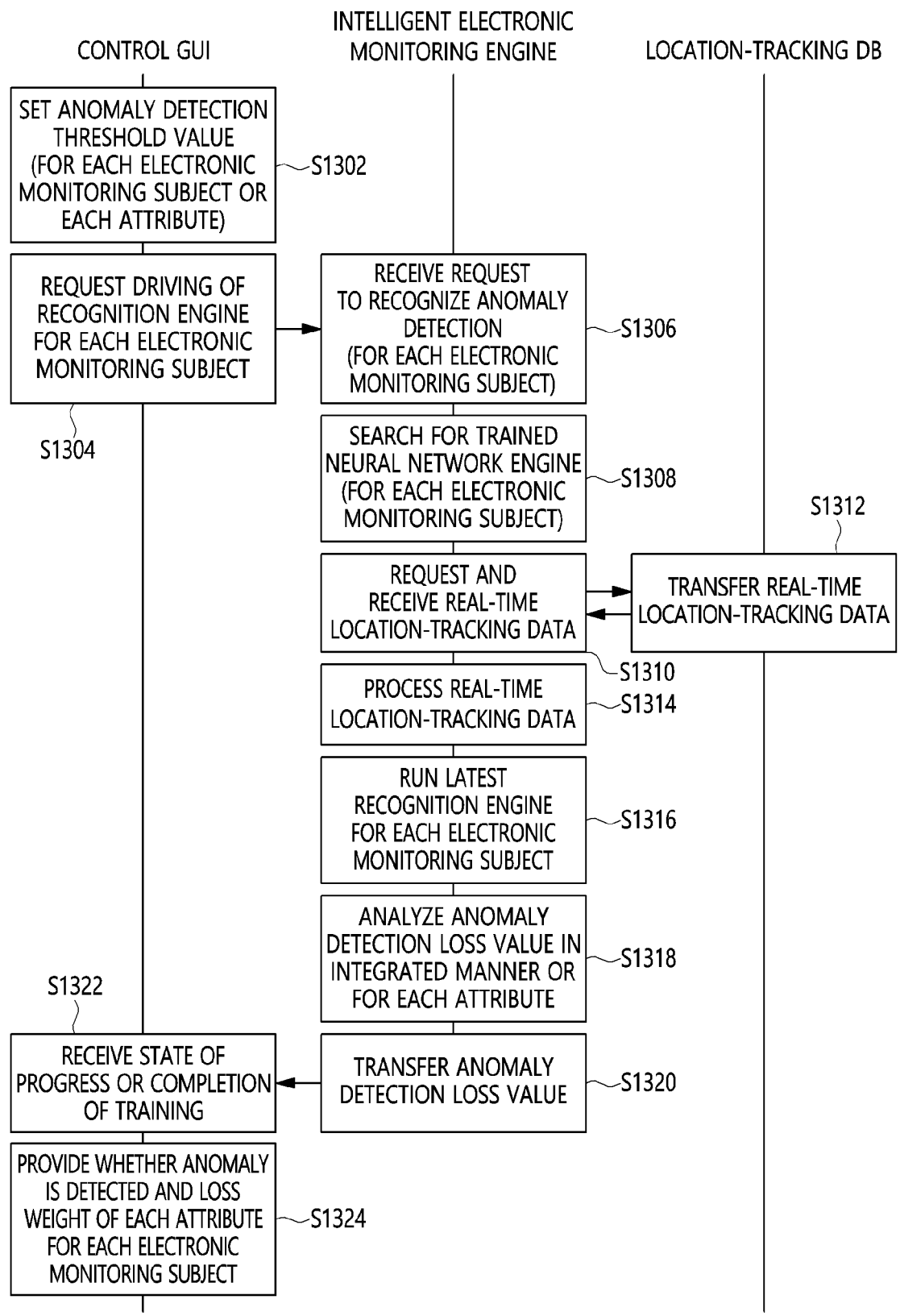
FIG. 13 is a flowchart illustrating in detail a recognition process for detecting an abnormal situation according to an embodiment of the present disclosure.

FIG. 13 is a flowchart illustrating in detail a recognition process for detecting an abnormal situation according to an embodiment of the present disclosure.

Referring to FIG. 13, in the recognition process for detecting an abnormal situation according to an embodiment of the present disclosure, first, an anomaly detection threshold value is set for each electronic monitoring subject or each attribute through the configuration unit of the control GUI at step S1302, and a request to drive a recognition engine for each electronic monitoring subject is made through the engine driving unit of the control GUI at step S1304.

Subsequently, the intelligent electronic monitoring engine may receive a request to recognize an abnormal situation at step S1306, retrieve and fetch the trained latest neural network engine for electronic monitoring subjects from the storage unit, and load the same in the recognition engine at step S1308.

Subsequently, when it requests location-tracking data from the location-tracking database at step S1310, the intelligent electronic monitoring engine may acquire the location-tracking data of each electronic monitoring subject from the location-tracking database in real time at step S1312.

Subsequently, the intelligent electronic monitoring engine may preprocess the location-tracking data (data processing) at step S1314 and transfer the processed data to the recognition engine for each electronic monitoring subject as the input thereof at step S1316.

Subsequently, the recognition unit of the intelligent electronic monitoring engine transfers a loss value for the data input thereto in real time to the postprocessing unit, determines whether an anomaly is detected, and calculates the loss values of attributes, thereby analyzing the causes of the abnormal situation at step S1318.

Subsequently, the analysis values for anomaly detection may be transferred to the display unit through the engine driving unit of the control GUI at steps S1320 and S1322, and whether an anomaly is detected and a weight for each attribute may be provided using numerical values and graphs capable of being perceived by a user at step S1324.

Figure 14:
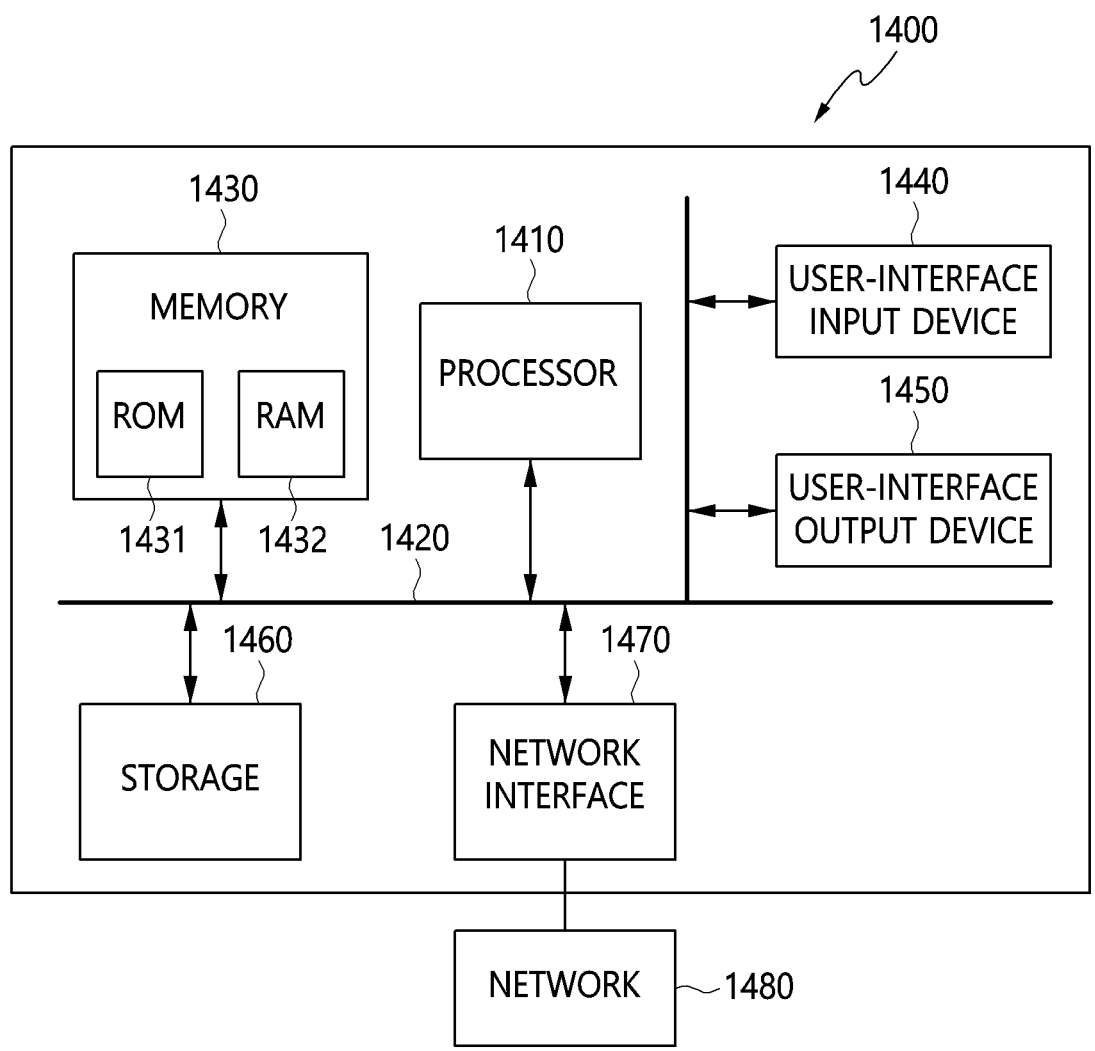
FIG. 14 is a view illustrating an apparatus for intelligent electronic monitoring according to an embodiment of the present disclosure.

FIG. 14 is a view illustrating an apparatus for intelligent electronic monitoring according to an embodiment of the present disclosure.

Referring to FIG. 14, the apparatus for intelligent electronic monitoring according to an embodiment of the present disclosure may be implemented in a computer system including a computer-readable recording medium. As illustrated in FIG. 14, the computer system 1400 may include one or more processors 1410, memory 1430, a user-interface input device 1440, a user-interface output device 1450, and storage 1460, which communicate with each other via a bus 1420. Also, the computer system 1400 may further include a network interface 1470 connected to a network 1480. The processor 1410 may be a central processing unit or a semiconductor device for executing processing instructions stored in the memory 1430 or the storage 1460. The memory 1430 and the storage 1460 may be any of various types of volatile or nonvolatile storage media. For example, the memory may include ROM 1431 or RAM 1432.

Accordingly, an embodiment of the present disclosure may be implemented as a non-transitory computer-readable medium in which methods implemented using a computer or instructions executable in a computer are recorded. When the computer-readable instructions are executed by a processor, the computer-readable instructions may perform a method according to at least one aspect of the present disclosure.

The processor 1410 stores electronic positioning data, received from positioning terminals, for each monitoring subject.

Here, the electronic positioning data may include an electronic positioning value, a positioning method, and the time of positioning, and may be stored in a database by being mapped to an identifier assigned to each monitoring subject.

Also, the processor 1410 detects an anomaly in at least one of the electronic positioning data for each monitoring subject, or the values of attributes constituting the electronic positioning data for each monitoring subject, or a combination thereof based on a pretrained anomaly detection model.

Here, a risk group of the monitoring subject may be identified.

Here, when the monitoring subject corresponds to a low-risk group, it may be determined that an anomaly is detected when an anomaly is detected in both a first detection result based on the electronic positioning data for each monitoring subject and a second detection result based on the values of the attributes.

Here, when the monitoring subject corresponds to a high-risk group, it may be determined that an anomaly is detected when an anomaly is detected in any one of the first detection result and the second detection result.

Here, when there is a requirement of a user who observes the monitoring subject, it may be determined that an anomaly is detected when an anomaly is detected in the second detection result depending on the requirement.

Here, the anomaly detection model may be managed by being separated based on the monitoring subject, the date and time, and a training period.

Here, a single anomaly detection model may be selected in consideration of the monitoring subject matched with the received electronic positioning data, the date and time when the electronic positioning data is received, and the most recently trained model based on the time at which the electronic positioning data is received, and an anomaly may be detected using the selected anomaly detection model.

Also, the processor 1410 extracts the causes of the detected anomaly based on the electronic positioning data in which the anomaly is detected.

Here, among the attributes constituting the electronic positioning data in which the anomaly is detected, at least one attribute, the loss value of which is greater than a preset attribute threshold value, may be extracted as the cause.

Here, the preset attribute threshold value may be set for each of the attributes in consideration of the characteristics of the attribute.

Also, the processor 1410 visually displays the detected anomaly and the extracted cause based on a Graphical User Interface (GUI).

Here, a real-time anomaly detection result, including an anomaly detection graph related to the anomaly and an abnormal-attribute detection graph related to the cause, may be provided.

Also, the processor 1410 may train the anomaly detection model with electronic positioning data stored in the database.

Here, the anomaly detection model may be trained so as to output whether a daily movement or a daily movement pattern is normal or abnormal when electronic positioning data is input.

Here, the anomaly detection model may be retrained based on electronic positioning data periodically collected during a preset certain period.

The memory 1430 stores the electronic positioning data.

Here, the memory 1430 may correspond to the location-tracking database illustrated in FIG. 3.

Using the above-described apparatus for intelligent electronic monitoring, active anomaly detection is performed by an AI-based electronic monitoring system, whereby the work burden of personnel dedicated to managing electronic monitoring subjects may be reduced.

Also, exhausting work for processing frequent alarms of the existing electronic monitoring system may be prevented, and an advanced intelligent electronic monitoring service that provides both whether an abnormal situation occurs and the causes of the abnormal situation may be provided.

Also, a scalable function for analyzing causes of an abnormal situation may be provided using various types of attribute information, and a phased and intensive abnormal-situation detection function may be provided using weights and threshold values for respective attributes related to an abnormal situation.

Also, customized management and supervision may be performed for each electronic monitoring subject in consideration of the attributes and characteristics of the electronic monitoring subject.

According to the present disclosure, problems with an electronic monitoring system, such as the shortage of dedicated personnel, limitations in merely processing alarms, an inefficient monitoring system, and the like, are remedied, and causes of an abnormal situation and figures for the causes are provided, whereby a probation officer is able to understand the situation.

Also, the present disclosure may reduce the work burden of personnel dedicated to managing electronic monitoring subjects and prevent exhausting work for processing frequent alarms through active anomaly detection of an AI-based electronic monitoring system.

Also, the present disclosure may provide an advanced intelligent electronic monitoring service that provides both information about whether an abnormal situation occurs and the causes thereof.

Also, the present disclosure may provide a scalable function for analyzing causes of an abnormal situation using various types of attribute information and provide a phased and intensive abnormal-situation-detection function using weights and threshold values for respective causes of an abnormal situation.

Also, the present disclosure may perform customized management/supervision in consideration of the attributes/characteristics of each electronic monitoring subject.

As described above, the method for intelligent electronic monitoring and the apparatus therefor according to the present disclosure are not limitedly applied to the configurations and operations of the above-described embodiments, but all or some of the embodiments may be selectively combined and configured, so the embodiments may be modified in various ways.

What is claimed is:

1. A method for intelligent electronic monitoring, performed by an apparatus for intelligent electronic monitoring, comprising:
    storing electronic positioning data, received from positioning terminals, for each monitoring subject, wherein the electronic positioning data represent locations of the positioning terminals;
    detecting an anomaly in at least one of the electronic positioning data for each monitoring subject, and values of attributes constituting the electronic positioning data for each monitoring subject based on a pretrained anomaly detection model, wherein the attributes constituting the electronic positioning data comprises location coordinates of the positioning terminals, and at least one of movement velocity, movement direction, or time information associated with the electronic positioning data;
    when an anomaly is detected, extracting a cause of the detected anomaly based on the values of the attributes constituting the electronic positioning data in which the anomaly is detected; and
    visually displaying the detected anomaly and the extracted cause based on a Graphical User Interface (GUI).

2. The method of claim 1, wherein detecting the anomaly includes
    identifying a risk group of a monitoring subject;
    when the monitoring subject corresponds to a low-risk group, determining that an anomaly is detected when an anomaly is detected in both a first detection result based on the electronic positioning data for each monitoring subject and a second detection result based on the values of the attributes; and
    when the monitoring subject corresponds to a high-risk group, determining that an anomaly is detected when an anomaly is detected in any one of the first detection result and the second detection result.

3. The method of claim 2, wherein detecting the anomaly comprises, when there is a requirement of a user who observes the monitoring subject, determining that an anomaly is detected when an anomaly is detected in the second detection result depending on the requirement.

4. The method of claim 1, wherein extracting the cause comprises extracting at least one attribute, a loss value of which is greater than a preset attribute threshold value, among attributes constituting the electronic positioning data in which the anomaly is detected, as the cause.

5. The method of claim 4, wherein the preset attribute threshold value is set for each of the attributes in consideration of characteristics of the attribute.

6. The method of claim 1, wherein the anomaly detection model is managed by being separated based on a monitoring subject, a date and time, and a training period.

7. The method of claim 6, wherein detecting the anomaly comprises
    selecting a single anomaly detection model in consideration of a monitoring subject matched with received electronic positioning data, a date and time when the electronic positioning data is received, and a most recently trained model based on the time at which the electronic positioning data is received; and
    detecting the anomaly using the selected anomaly detection model.

8. The method of claim 1, wherein the electronic positioning data includes an electronic positioning value, a positioning method, and a time of positioning and is stored in a database by being mapped to an identifier assigned to each monitoring subject.

9. The method of claim 8, further comprising:
    training the anomaly detection model with the electronic positioning data stored in the database,
    wherein the anomaly detection model is trained so as to output whether a daily movement or a daily movement pattern is normal or abnormal when electronic positioning data is input.

10. The method of claim 9, wherein the anomaly detection model is retrained based on the electronic positioning data periodically collected for a preset certain period.

11. The method of claim 1, wherein visually displaying the detected anomaly and the extracted cause comprises providing a real-time anomaly detection result including an anomaly detection graph related to the anomaly and an abnormal-attribute detection graph related to the cause.

12. An apparatus for intelligent electronic monitoring, comprising:
    a processor configured to:
        store electronic positioning data, received from positioning terminals, for each monitoring subject,, wherein the electronic positioning data represent locations of the positioning terminals;
        detect an anomaly in at least one of the electronic positioning data for each monitoring subject, and values of attributes constituting the electronic positioning data for each monitoring subject based on a pretrained anomaly detection model, wherein the attributes constituting the electronic positioning data comprises location coordinates of the positioning terminals, and at least one of movement velocity, movement direction, or time information associated with the electronic positioning data;
        extract, when an anomaly is detected, a cause of the detected anomaly based on the values of the attributes constituting the electronic positioning data in which the anomaly is detected; and
        visually display the detected anomaly and the extracted cause based on a Graphical User Interface (GUI); and
    a database configured to store the electronic positioning data.

13. The apparatus of claim 12, wherein the processor identifies a risk group of a monitoring subject, determines that an anomaly is detected when an anomaly is detected in both a first detection result based on the electronic positioning data for each monitoring subject and a second detection result based on the values of the attributes if the monitoring subject corresponds to a low-risk group, and determines that an anomaly is detected when an anomaly is detected in any one of the first detection result and the second detection result if the monitoring subject corresponds to a high-risk group.

14. The apparatus of claim 13, wherein, when there is a requirement of a user who observes the monitoring subject, the processor determines that an anomaly is detected when an anomaly is detected in the second detection result depending on the requirement.

15. The apparatus of claim 12, wherein the processor extracts at least one attribute, a loss value of which is greater than a preset attribute threshold value, among attributes constituting the electronic positioning data in which the anomaly is detected, as the cause.

16. The apparatus of claim 15, wherein the preset attribute threshold value is set for each of the attributes in consideration of characteristics of the attribute.

17. The apparatus of claim 12, wherein the anomaly detection model is managed by being separated based on a monitoring subject, a date and time, and a training period.

18. The apparatus of claim 17, wherein the processor selects a single anomaly detection model in consideration of a monitoring subject matched with received electronic positioning data, a date and time when the electronic positioning data is received, and a most recently trained model based on the time at which the electronic positioning data is received and detects the anomaly using the selected anomaly detection model.

19. The apparatus of claim 12, wherein the electronic positioning data includes an electronic positioning value, a positioning method, and a time of positioning and is stored in the database by being mapped to an identifier assigned to each monitoring subject.

20. The apparatus of claim 19, wherein:

the processor trains the anomaly detection model with the electronic positioning data stored in the database, and the anomaly detection model is trained so as to output whether a daily movement or a daily movement pattern is normal or abnormal when electronic positioning data is input.

* * * * *